(12) United States Patent
Cuevas (10) Patent No.: US 12,472,070 B2
(45) Date of Patent: Nov. 18, 2025

(54) METHOD AND APPARATUS FOR JOINT STABILIZATION

(71) Applicant: Resilient Surgical Holdings, Inc., Wilmington, DE (US)

(72) Inventor: Caleb Cuevas, Milton, GA (US)

(73) Assignee: RESILIENT SURGICAL HOLDINGS, INC.

( * ) Notice: Subject to any disclaimer, the term of this patent is extended or adjusted under 35 U.S.C. 154(b) by 96 days.

(21) Appl. No.: 18/529,756

(22) Filed: Dec. 5, 2023

(65) Prior Publication Data
US 2025/0041064 A1    Feb. 6, 2025

Related U.S. Application Data

(60) Provisional application No. 63/530,743, filed on Aug. 4, 2023.

(51) Int. Cl.
*A61F 2/30* (2006.01)
*A61B 17/17* (2006.01)

(52) U.S. Cl.
CPC ...... *A61F 2/30988* (2013.01); *A61B 17/1757* (2013.01); *A61F 2002/30995* (2013.01)

(58) Field of Classification Search
CPC .................. A61F 2/30988; A61B 17/1757
See application file for complete search history.

(56) References Cited

U.S. PATENT DOCUMENTS

| | | | |
|---|---|---|---|
| 4,697,586 A * | 10/1987 | Gazale | A61B 17/1757 606/53 |
| 5,183,054 A | 2/1993 | Burkholder et al. | |
| 5,409,453 A | 4/1995 | Lundquist et al. | |

(Continued)

FOREIGN PATENT DOCUMENTS

| | | |
|---|---|---|
| CN | 112118828 A | 12/2020 |
| EP | 2641633 B1 | 4/2018 |

(Continued)

OTHER PUBLICATIONS

Blunt-Tip Coaxial Introducer: A Revisited Tool for Difficult CT-Guided Biopsy in the Chest and Abdomen, Vascular and Interventional Radiology—Technical Innovation, Aug. 2009.

(Continued)

*Primary Examiner* — Christian A Sevilla
(74) *Attorney, Agent, or Firm* — Burr & Forman LLP; Nathaniel T. Quirk, Esq.

(57) ABSTRACT

A joint stabilization method is disclosed. The method includes placing an elongated blunt-tipped pin within a joint of a human, the blunt-tipped pin including a cannulated interior, placing at least one of contrast and medicine within the cannulated interior of the elongated blunt-tipped pin, placing a dilator having a substantially hollow interior over the elongated blunt-tipped pin, while the elongated blunt-tipped pin remains inserted within the joint, placing a drill guide over the dilator and the elongated blunt-tipped pin, the drill guide having a substantially hollow interior section, removing the dilator and the elongated blunt-tipped pin, leaving the drill guide, drilling through the interior of the drill guide to provide a pathway for an implant, and placing the implant within the pathway, the implant to reside within the joint.

14 Claims, 10 Drawing Sheets

(56) References Cited

U.S. PATENT DOCUMENTS

| | | | |
|---|---|---|---|
| 7,824,404 | B2 | 11/2010 | Godara et al. |
| 8,323,277 | B2 | 12/2012 | Vilims |
| 9,949,789 | B2 | 4/2018 | Godara et al. |
| 10,292,720 | B2 | 5/2019 | Donner |
| 12,220,121 | B2* | 2/2025 | Gordon .............. A61B 17/0482 |
| 2003/0083688 | A1* | 5/2003 | Simonson ............ A61B 17/025 |
| | | | 606/191 |
| 2005/0245928 | A1* | 11/2005 | Colleran .............. A61B 17/708 |
| | | | 606/86 A |
| 2007/0088362 | A1* | 4/2007 | Bonutti ............... A61F 2/30749 |
| | | | 606/99 |
| 2007/0156136 | A1 | 7/2007 | Godara et al. |
| 2011/0184519 | A1* | 7/2011 | Trieu ................. A61B 17/7055 |
| | | | 606/86 A |
| 2015/0099936 | A1 | 4/2015 | Burdulis et al. |
| 2016/0317211 | A1 | 11/2016 | Harrison et al. |
| 2019/0110833 | A1 | 4/2019 | Pellegrino et al. |
| 2021/0169556 | A1 | 6/2021 | Wang et al. |
| 2021/0169557 | A1 | 6/2021 | Wang et al. |
| 2021/0169558 | A1 | 6/2021 | Wang |
| 2022/0296255 | A1 | 9/2022 | Patel et al. |

FOREIGN PATENT DOCUMENTS

| | | |
|---|---|---|
| KR | 20220097901 | 10/2020 |
| WO | WO2021072061 A1 | 4/2021 |

OTHER PUBLICATIONS

The Role of Tracheal Tube Introducers and Stylets in Current Airway Management, Springer Science+Business Media Dordrecht 2017, Published Apr. 16, 2016.

* cited by examiner

METHOD AND APPARATUS FOR JOINT STABILIZATION

CROSS-REFERENCE TO RELATED APPLICATION

The present application claims priority to U.S. Provisional Patent Application No. 63/530,743, entitled Method and Apparatus for Sacroiliac Joint Stabilization, filed on Aug. 4, 2023, the content of which is hereby incorporated by reference in its entirety.

TECHNICAL FIELD

The present disclosure relates to the field of sacroiliac joints and more particularly to a minimally invasive procedure that accurately locates the sacroiliac joint and provides guidance to allow a surgeon to insert an implant to fuse the sacroiliac joint.

BACKGROUND

The sacroiliac joint ("SI joint") is the joint between the sacrum and the ilium bones of the pelvis, connecting the spine to the hips. The sacrum supports the spine and is supported by an ilium on each side. The human body has two SI joints, one on the left and one on the right. The SI joints are located between the iliac bones and the sacrum, connecting the spine to the hips. The two joints provide support and stability and play a major role in absorbing impact when walking and lifting. Strong ligaments and muscles support the SI joints. There is a very small amount of motion in the joint for normal body flexibility.

As people age and their bones become arthritic, ligaments stiffen, cartilage wears down and bones may rub together causing pain. In addition to age, SI joint pain can occur as the result of a fall, work injury, car accident, pregnancy and childbirth, or as a result of hip or spine surgery. Further, scientific data shows pain from the SI joint can feel like disc or lower back pain.

While injecting the joint with steroids or ablating the joint by applying electrical current to destroy the nerve fibers carrying pain signals in the joint are procedures that tend to reduce the pain associated with SI joint discomfort, these procedures usually only provide temporary relief. Minimally invasive SI fusion surgery is usually more effective. SI joint fusion is a minimally invasive surgical procedure that aims to stabilize the SI joint by fusing the SI joint. The procedure is done through a small incision and typically takes less than an hour.

However, these types of surgeries are not without their inherent problems and complications. Many procedures are complicated, and use complex instrumentation, and when using a posterior approach to enter the SI joint, sometimes result in the implant being placed in an improper location. This may be caused by the use of needles, Q-wires, or bendable guidewires resulting in dysfunctional anatomy/sacral dysmorphism, which can result in post-operative complications for the patient.

The present disclosure overcomes the problems associated with current SI joint fusion procedures.

Further objects and advantages of the present invention will be discussed below by means of exemplifying embodiments.

SUMMARY

In accordance with an embodiment of one aspect of the present disclosure, a joint stabilization method is disclosed. The method includes placing an elongated blunt-tipped pin within a joint of a human, the blunt-tipped pin including a cannulated interior, placing at least one of contrast and medicine within the cannulated interior of the elongated blunt-tipped pin, placing a dilator having a substantially hollow interior over the elongated blunt-tipped pin, while the elongated blunt-tipped pin remains inserted within the joint, placing a drill guide over the dilator and the elongated blunt-tipped pin, the drill guide having a substantially hollow interior section, removing the dilator and the elongated blunt-tipped pin, leaving the drill guide, drilling through the interior of the drill guide to provide a pathway for an implant, and placing the implant within the pathway, the implant to reside within the joint.

In accordance with another embodiment of this aspect, the method includes removably affixing one end of a connector to a proximal end of the elongated blunt-tipped pin, fastening a liquid holding container to an opposite end of the connector, and releasing from the liquid holding container at least one of contrast and medicine through the connector and into the cannulated interior of the blunt-tipped pin. In accordance with another embodiment, the distal end of the elongated blunt-tipped pin is substantially non-bending. In accordance with another embodiment, the joint into which the elongated blunt-tipped pin is placed is a sacroiliac (SI) joint. In accordance with another embodiment, the method further includes utilizing a handle to hold, handle and/or manipulate the elongated blunt-tipped pin. In accordance with another embodiment, placing of the dilator over the elongated blunt-tipped pin includes placing the dilator into the joint to distract the joint. In accordance with another embodiment, the dilator includes a window to allow a user to at least one of view the depth that the dilator has been inserted into the joint and ensure flush contact with the elongated blunt-tipped pin.

In accordance with another aspect of the present disclosure, a system for stabilizing a human joint is disclose. The system includes an elongated blunt-tipped pin configured to be inserted within a joint of a human, the blunt-tipped pin including a cannulated interior, a dilator having a substantially hollow interior configured to be placed over the elongated blunt-tipped pin, while the elongated blunt-tipped pin remains inserted within the joint, and a drill guide having a substantially hollow interior configured to be placed over the dilator and the elongated blunt-tipped pin, the drill guide configured to receive at least a portion of a drill for providing a pathway for an implant.

In accordance with another embodiment of this aspect, the cannulated interior of the elongated blunt-tipped pin is configured to receive at least one of contrast and medicine therein. In accordance with another embodiment, the elongated blunt-tipped pin is substantially non-bending. In accordance with another embodiment, the distal end of the elongated blunt-tipped pin is substantially non-bending. In accordance with another embodiment, the joint into which the elongated blunt-tipped pin is placed is a sacroiliac (SI) joint. In accordance with another embodiment, the system further includes a connector configured to be removably affixed at a first end to a proximal end of the elongated blunt-tipped pin and fastened at its second end to a liquid holding container containing at least one of contrast and medicine, which is released through the connector and into the cannulated interior of the blunt-tipped pin. In accordance with another embodiment, placing of the dilator over the elongated blunt-tipped pin includes placing the dilator into the joint to distract the joint. In accordance with another embodiment, the dilator includes a window to allow a user to at least one of view the depth that the dilator has been inserted into the joint and ensure flush contact with the elongated blunt-tipped pin.

In accordance with yet another aspect of the present disclosure, a stylet used for stabilization of an SI Joint is disclosed. The elongated blunt-tipped pin includes an elongated body having a substantially cannulated interior portion, the elongated body having a first open end, the first open end configured to receive at least one of contrast and medicine, the elongated shaft having a second end configured to probe the SI joint.

In accordance with another embodiment of this aspect, the blunt-tipped pin is substantially non-bending. In accordance with another embodiment, the first end is configured to be removably affixed to a first end of a connector, wherein a liquid holding container is removably affixed to a second end of the connector, the liquid holding container configured to release at least one of contrast and medicine through the connector and into the cannulated interior portion of the blunt-tipped pin.

BRIEF DESCRIPTION OF DRAWINGS

A more complete understanding of the present embodiments, and the attendant advantages and features thereof, will be more readily understood by reference to the following detailed description when considered in conjunction with the accompanying drawings wherein.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teaching.

DETAILED DESCRIPTION

The present disclosure is a minimally invasive joint stabilization process that aims to fuse a human joint, by stabilizing it. The procedure is done through a small incision (about 5/8 inch or 16 mm) and in many cases can be completed in under an hour. After a series of steps, described in greater detail below, a dense cortical bone allograft is placed directly into a dysfunctional human joint. This allograft, also referred to herein as an "implant" is a natural material with a larger footprint that enhances bone fusion. In one non-limiting embodiment, the human joint is the sacroiliac (SI) Joint. Throughout this disclosure, although the SI Joint is the joint referred to as receiving the implant via the disclosed inventive process, the disclosed invention is not limited for use only in the SI Joint but may be used in any human joint.

In accordance with an embodiment, a joint stabilization method by way of, for example, Arthrodesis, is disclosed. The method includes placing an elongated stylet blunt tipped pin (also referred to as a "joint finder") within a joint of a human. The blunt-tipped pin or joint finder includes a cannulated interior, with a removable threaded, stylet cap and stylet. The robust feature of the blunt-tipped pin is that it allows the user to have tactile feedback when entering the cartilaginous joint. In one embodiment, to further confirm accuracy or placement of the blunt-tipped pin into the joint, the threaded cap with a stylet can be removed from the blunt-tipped pin and a threaded attachment, such as, for example, a Luer lock can be added onto the cannulated blunt tipped pin. This reduces any negative pressure and allows for a steady flow, placing at least one of contrast, by way of arthrography or arthrogram, and medicine within the cannulated interior of the elongated blunt tipped pin. The Luer lock attachment can be removed, and a dilator having a substantially hollow interior can be placed over the elongated blunt-tipped pin while the elongated blunt-tipped pin remains inserted within the joint.

The dilator may then be advanced into the joint, which serves as a distraction method between the sacrum and ilium as well as the cluneal, medial cluneal nerve root, which generates pain from a dysfunctional, diseased, or a hypertrophic joint. A drill guide may then be placed over the dilator and the elongated blunt-tipped pin. The drill guide has a substantially hollow interior section, with wings or a T-shaped feature to ensure proper alignment along the joint line. The dilator and the elongated blunt-tipped pin is removed, leaving the drill guide. A hand drill which, in one embodiment, has a "hard stop" safety feature, is used to provide a pathway for an implant, which is placed within the pathway, such that the implant resides within the joint.

Figure 1:
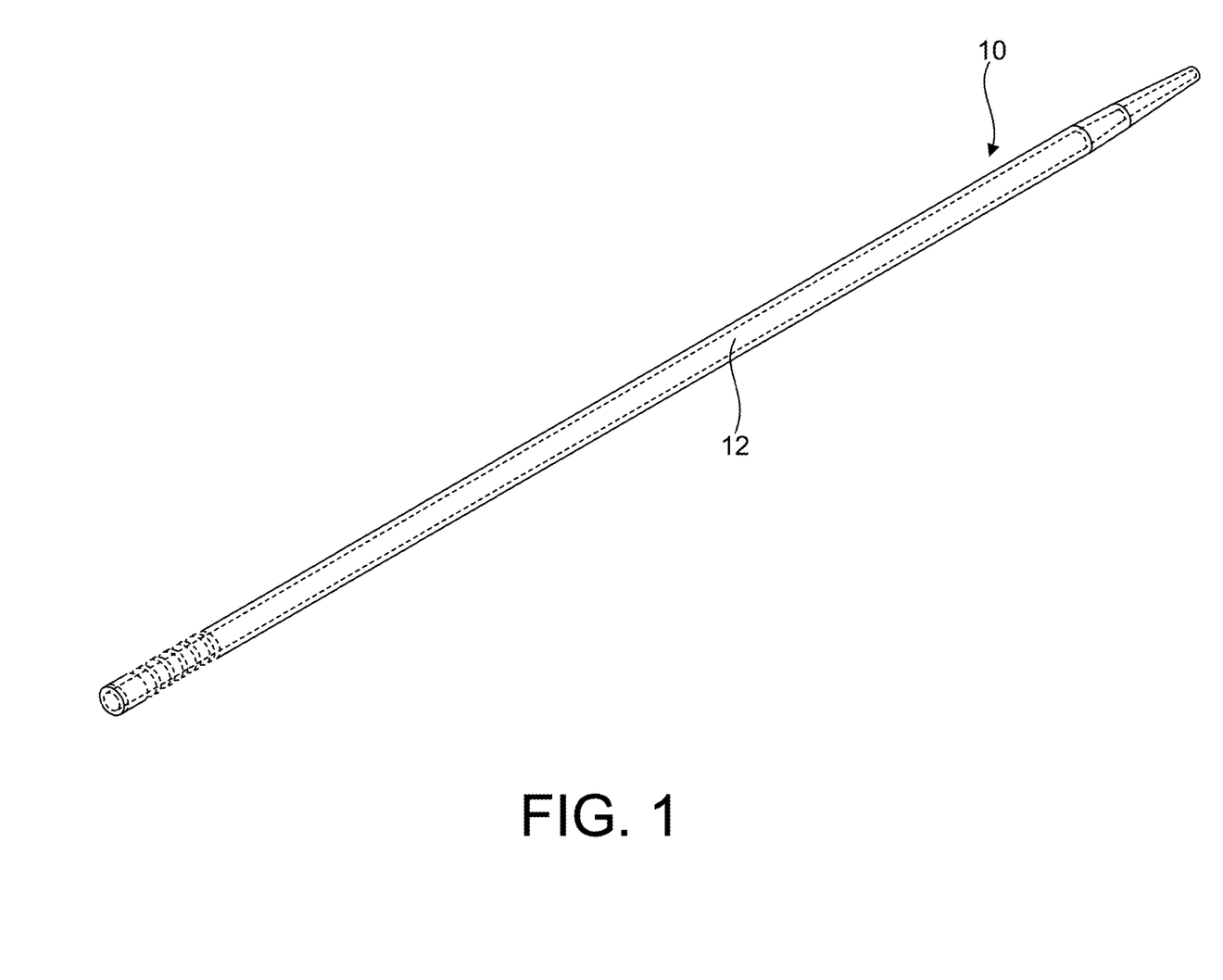
FIG. 1 is a perspective view of an elongated blunt-tipped pin used in the joint stabilization process of the present disclosure.
Figure 2:
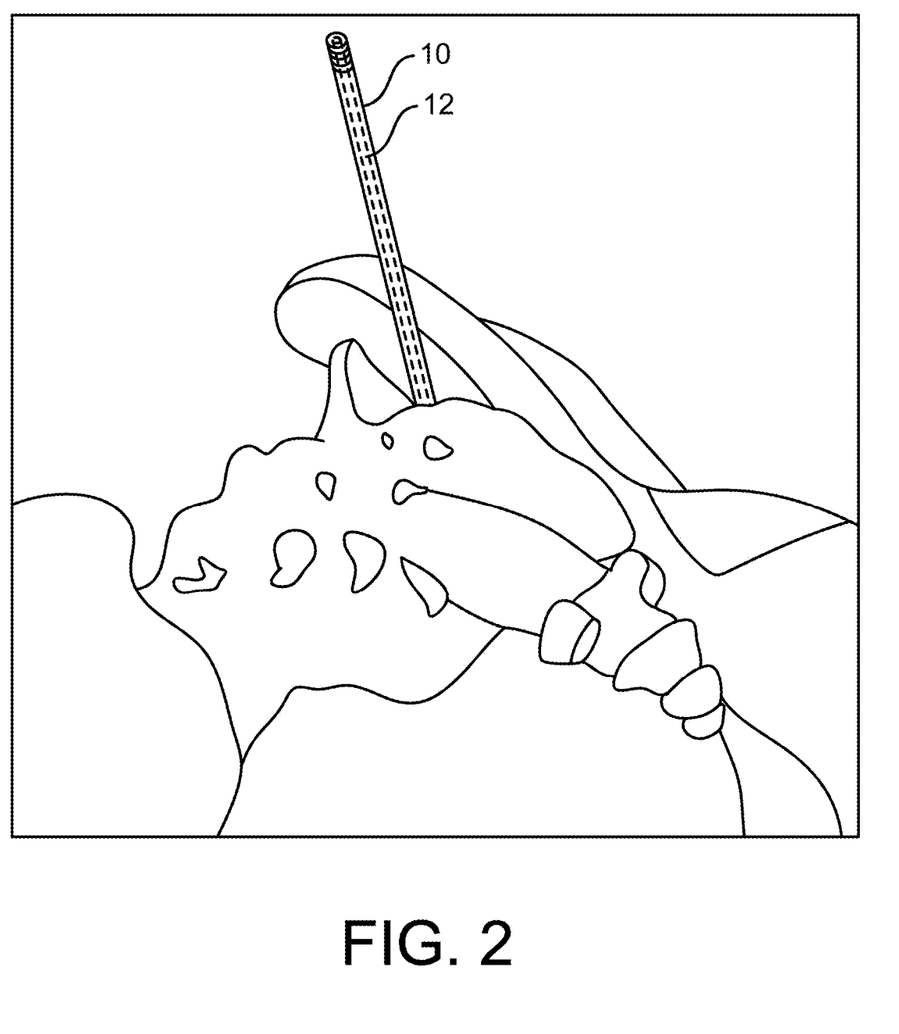
FIG. 2 is a view of the elongated blunt-tipped pin being inserted into a human joint.

The initial step of the process involves inserting an elongated blunt-tipped pin (also referred to as a "joint finder") 10 into the SI joint. FIG. 1 and FIG. 2 illustrate a blunt-tipped pin 10 used in this process. Blunt-tipped pin 10 is an elongated blunt-tipped pin, sturdy and robust, typically made of stainless steel, and in some embodiments approximately 4.5 mm in diameter, although the present disclosure is not limited to the length, diameter, or material of the blunt-tipped pin shown in FIG. 1. Blunt-tipped pin 10 is substantially non-bending and rigid and will not deviate or bend as it is inserted into the joint like typical guidewires, K-wires, or other sharp instruments. Blunt-tipped pin 10 of the present disclosure is valuable when dealing with dysmorphic anatomy and a severely diseased joint. Typical guidewires, K-wires, sharps, etc., are more prone to deviate from the desired final position because of their unwanted flexibility. In one embodiment, blunt-tipped pin 10 has a blunt tip so as not to cause damage to the joint or bone as a needle or other sharp instruments would.

In one embodiment, blunt-tipped pin 10 includes a hollow interior or cannula 12, into which liquid contrast, and/or medication may enter and be injected or otherwise introduced into the SI joint. Advantageously, in one embodiment, medicine can be delivered to the SI joint through the cannula 12 in blunt-tipped pin 10, and in some cases delivered simultaneously while blunt-tipped pin 10 probes and accesses the SI joint. In another embodiment, contrast can be poured through the cannula 12 of blunt-tipped pin 10 to assist in helping the user accurately locate the SI joint. In some embodiments, a blunt-tipped pin cap (not shown) is placed over one end of elongated blunt-tipped pin 10.

Figure 3:
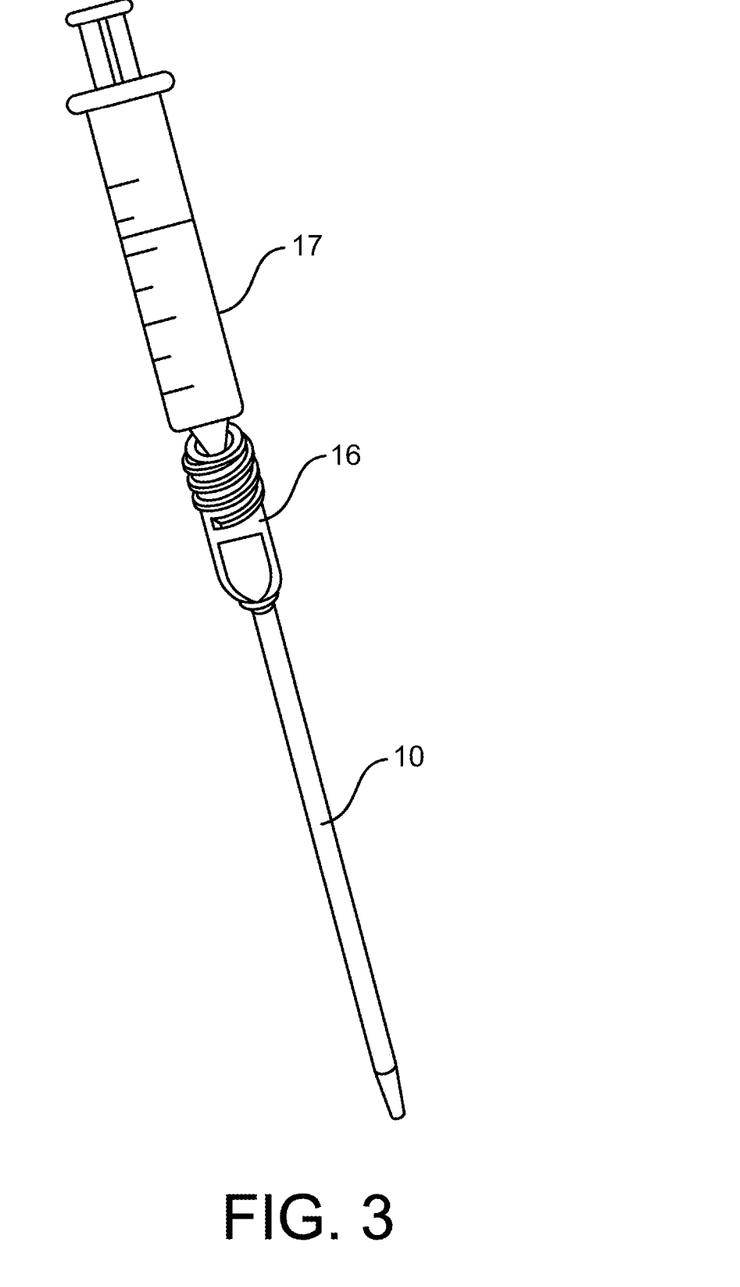
FIG. 3 is a view of elongated blunt-tipped pin of the present disclosure attached to a connector and syringe.
Figure 4:
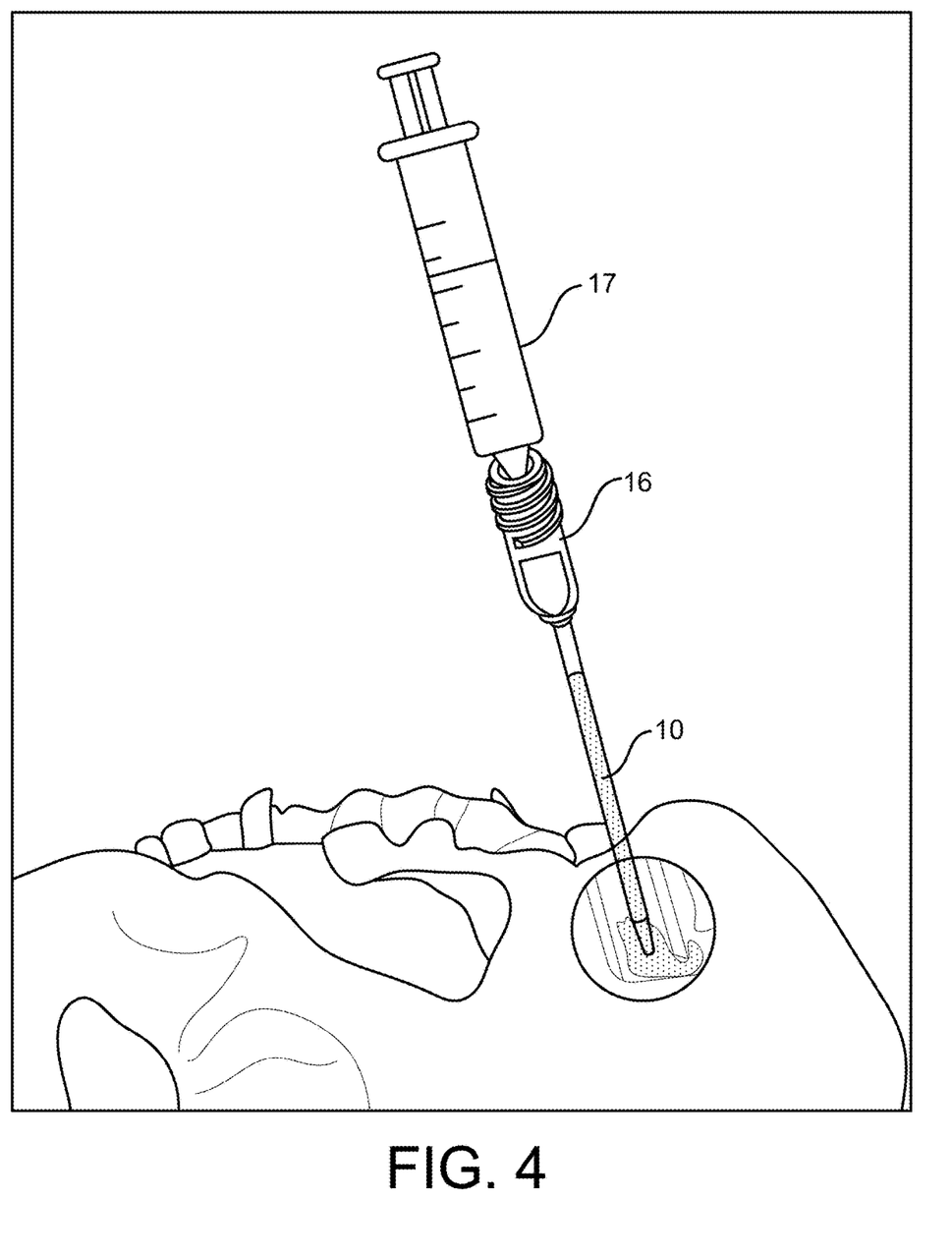
FIG. 4 is view showing a liquid contrast being injected from the syringe into the elongated blunt-tipped pin.

In one embodiment, as shown in FIG. 3, a connector 16 such as, for example but not limited to a Luer lock connector, is removably secured onto the proximal end of elongated blunt-tipped pin 10. In one embodiment, connector 16 has a threaded end, which is removably connected to the proximate end of blunt-tipped pin 10. In one embodiment, a syringe 17 or other similar liquid-holding container filled with contrast and/or medication may then secured to the opposite, non-threaded end of connector 16. In one embodiment, connector 16 prevents the back flow of contrast or medicine from blunt-tipped pin 10. Once secure, the contrast and/or medication may be released from the syringe 17 and through the connector 16 enter into the cannulated interior 12 of elongated blunt-tipped pin 10 and spread throughout the joint, as shown in FIG. 4. Injecting contrast into the joint in the afore-mentioned manner provides a clear target for the surgeon to ensure superior safety and accuracy of graft/implant placement. Injecting medicine through the cannulated interior 12 of blunt-tipped pin 10 allows medicine to be delivered into the joint simultaneously with or after blunt-tipped pin 10 has probed and found the joint. In one embodiment, a handle (not shown) can be used to hold, handle and manipulate blunt-tipped pin 10. In another embodiment, the handle includes a radiolucent tip.

Figure 5:
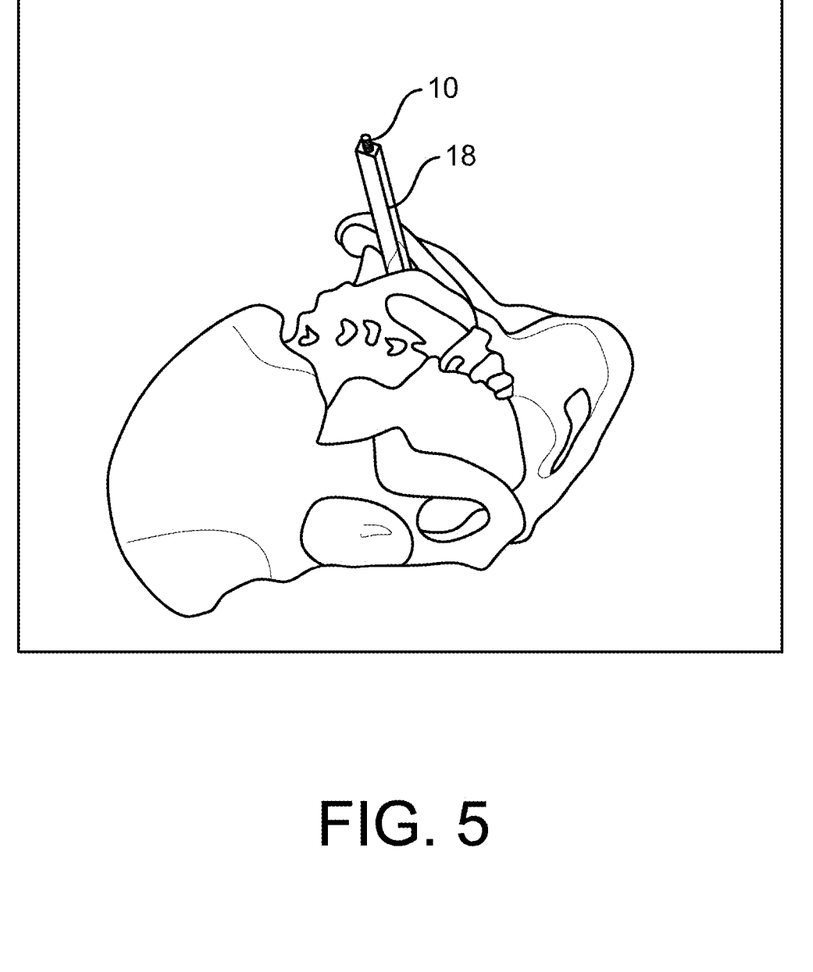
FIG. 5 is a view showing a dilator being placed over the elongated blunt-tipped pin.

As shown in FIG. 5, after elongated blunt-tipped pin 10 has been inserted into the joint, a dilator 18, which also has a hollow interior, is placed over blunt-tipped pin 10 while blunt-tipped pin 10 remains inserted within the SI joint, with the purpose of distracting the joint. Thus, dilator 18 has a hollow or cannulated interior that is large enough to be placed over blunt-tipped pin 10, as shown in FIG. 5. In some embodiments, dilator 18 includes a beveled, distal end. In a percutaneous method, dilator 18 enters the SI joint space and distracts the tissue. In one embodiment (not shown in FIG. 5), dilator 18 includes a window in the shaft of the dilator 18 to allow the user to view the depth that dilator 18 has been inserted into the joint and to ensure flush contact with elongated blunt-tipped pin 10. The window may also be used to assure that the dilator 18 is placed properly over blunt-tipped pin 10 without interfering with or compromising the position of the blunt-tipped pin 10. In one embodiment, a mallet or similar device can be used to tap down dilator 18 to better assure that it is in proper position over blunt-tipped pin 10.

Figure 6:
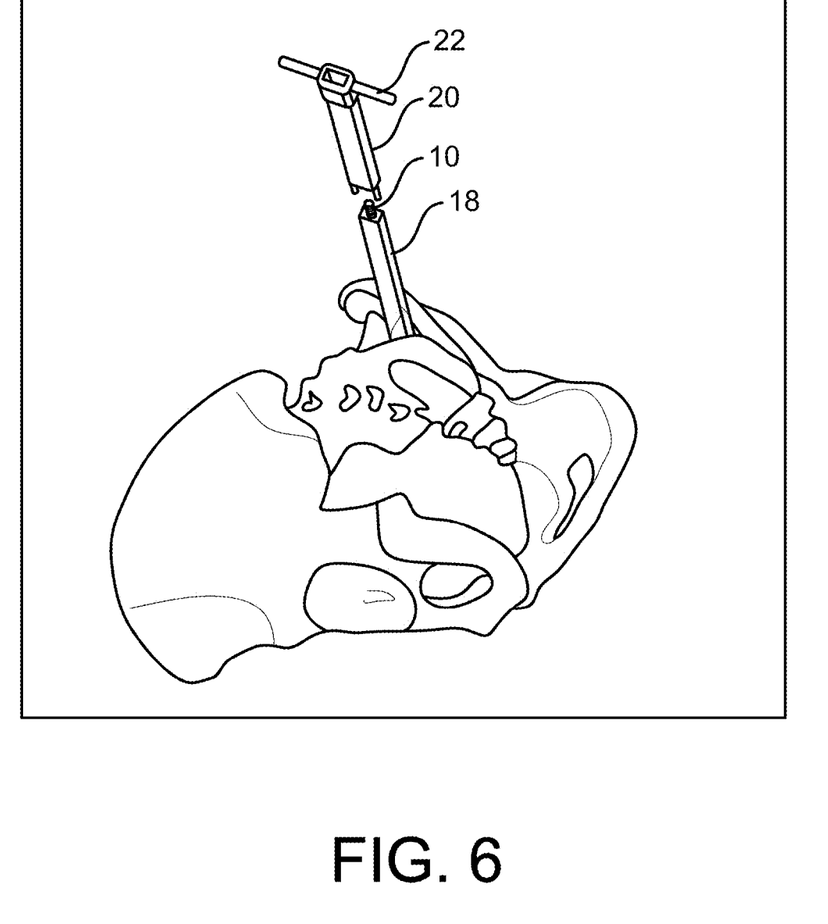
FIG. 6 is a view showing a drill guide being placed over the dilator and elongated blunt-tipped pin.

Referring now to FIG. 6, a drill guide (also called "access portal") 20, can be seen. In one embodiment, drill guide 20 may include, at its proximate end, a pair of "wings" 22. Drill guide 20 also has a hollow or cannulated interior dimensioned so that the interior of drill guide 20 may fit therein both dilator 18 and blunt-tipped pin 10 as shown in FIG. 6. Further, the cannulated interior of drill guide 20 must also be sized to allow an implant to be inserted therethrough.

Figure 7:
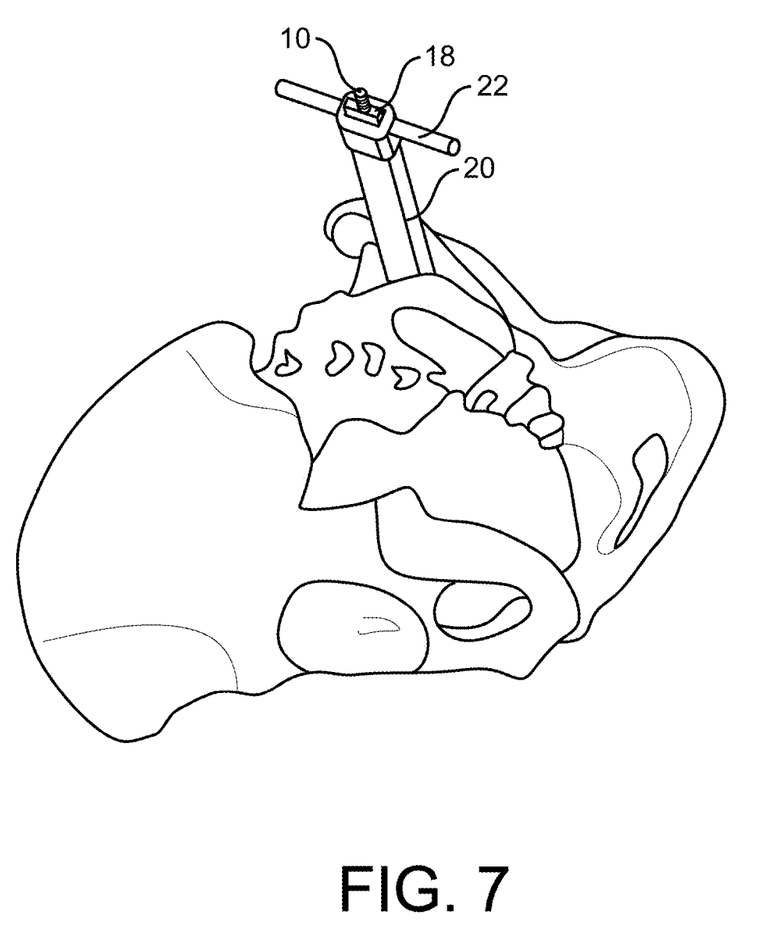
FIG. 7 is a view showing the drill guide after placement over the dilator and elongated blunt-tipped pin.
Figure 8:
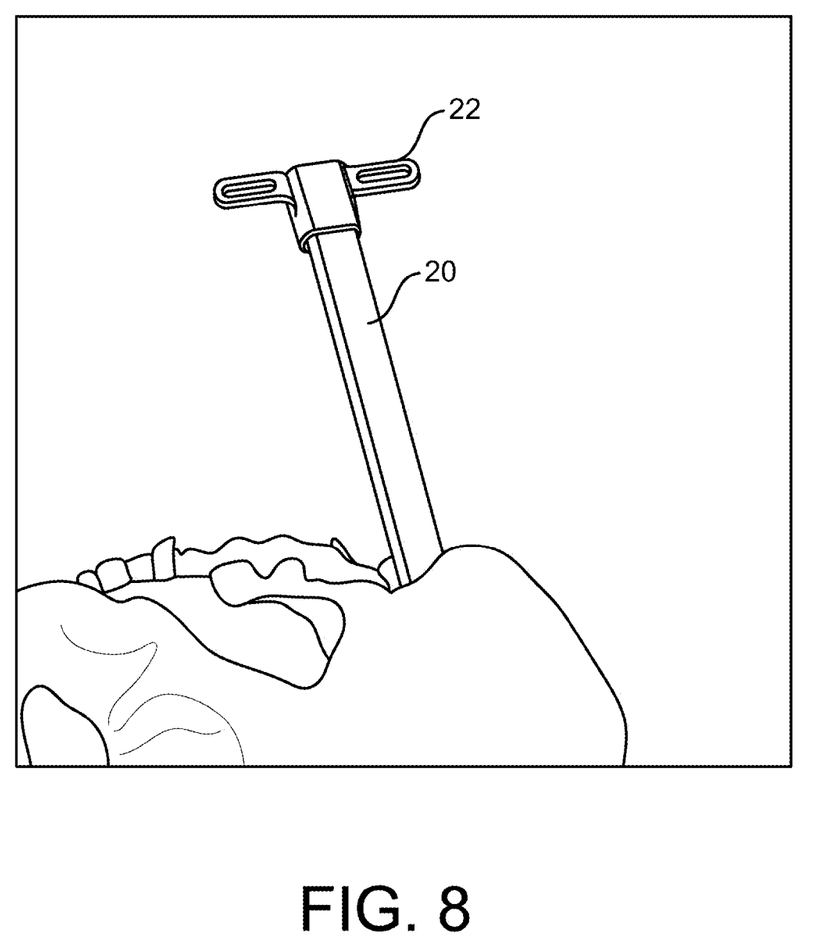
FIG. 8 is a view showing the drill guide remaining after removal of the dilator and elongated blunt-tipped pin.

After dilator 18 is placed over elongated blunt-tipped pin 10, drill guide 20 is placed over both the dilator 18 and elongated blunt-tipped pin 10, as shown in FIG. 7. In one embodiment, the user can line up wings 22 of drill guide 20 with the joint in order to assure accurate placement of drill guide 20. In one embodiment, a mallet can be used to press drill guide 20 further down into the joint, such that the proximate end of blunt-tipped pin 10 extends up an out of both dilator 18 and drill guide 20, as shown in FIG. 7. At this point, the user may remove blunt-tipped pin 10. Dilator 18 may then also be removed, leaving only drill guide 20, which is now properly placed within the joint, as shown in FIG. 8. Drill guide 20, now properly placed within the joint, acts as a guide through which an implant can be placed directly into the joint to stabilize it.

Figure 9:
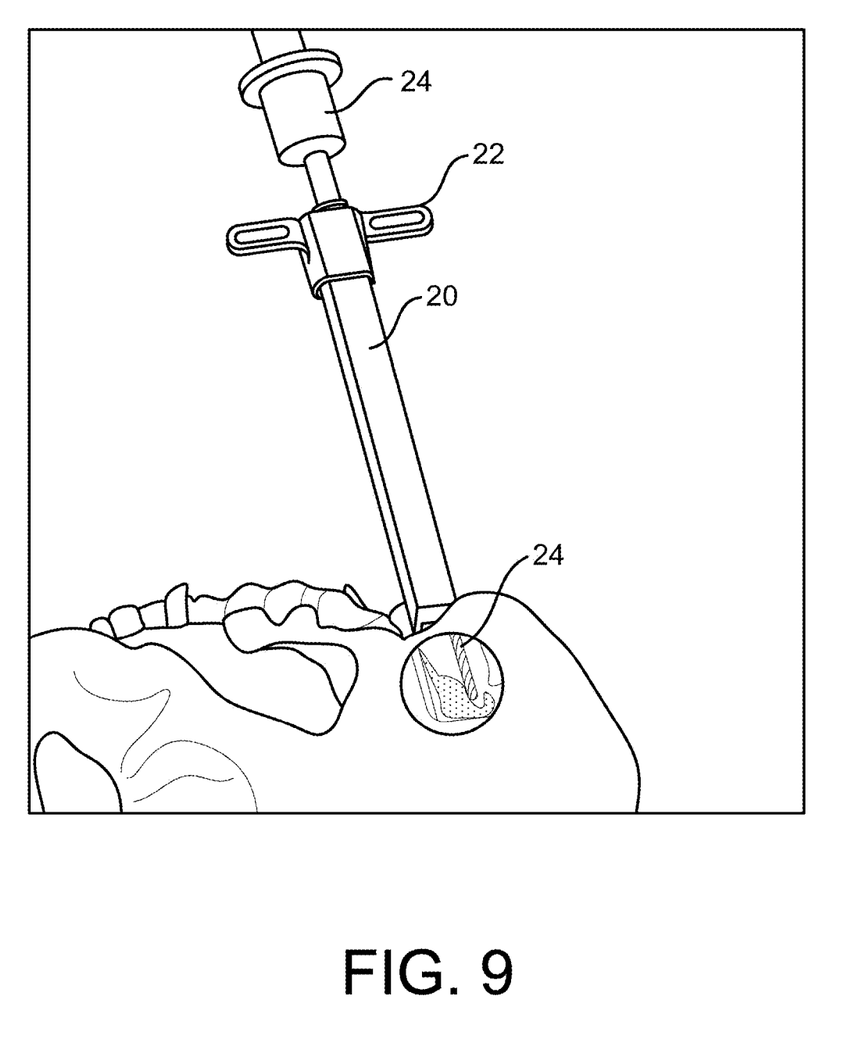
FIG. 9 is view showing the insertion of a drill through the drill guide.
Figure 10:
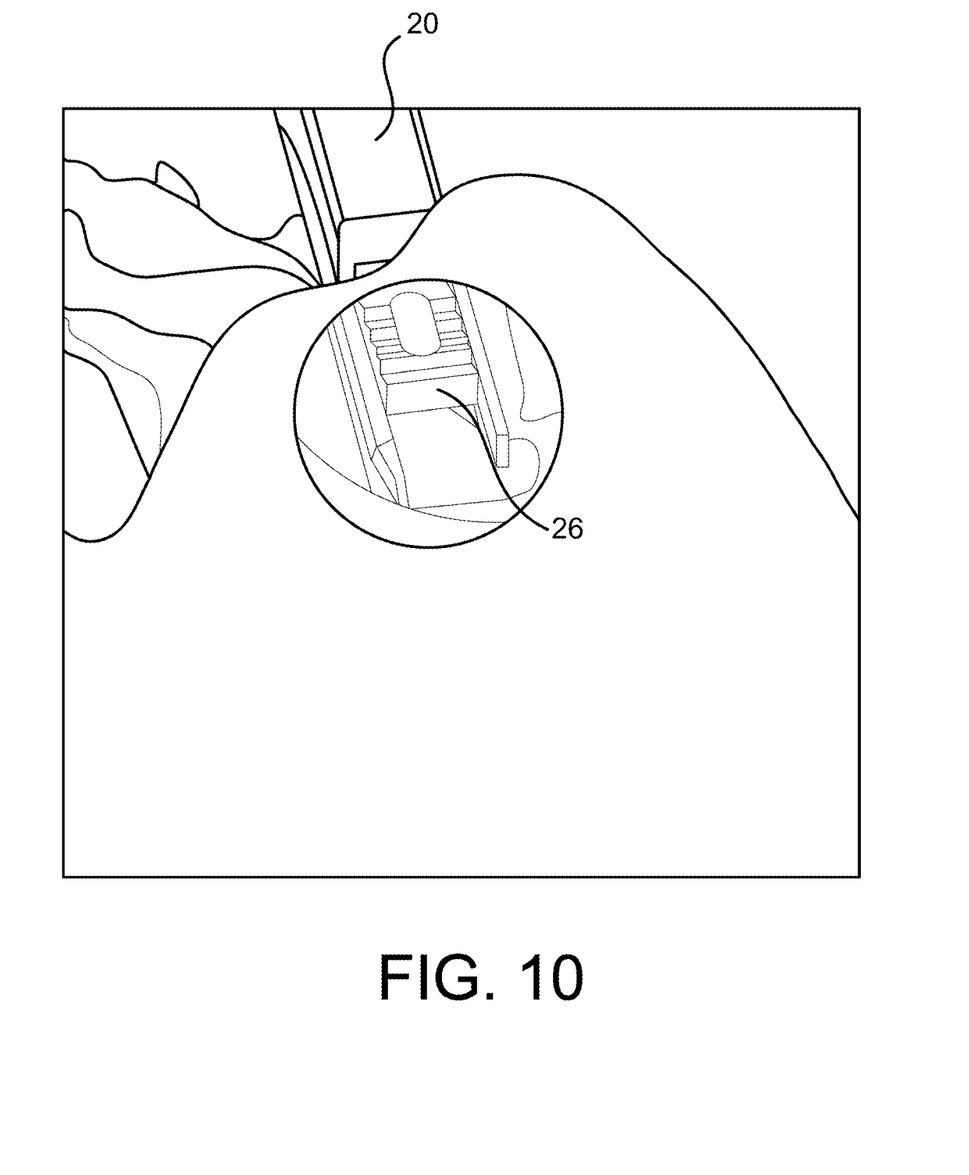
FIG. 10 is a view showing the insertion of an implant through the drill guide into the joint.

As shown in FIG. 9, a drill 24 may then be inserted within the hollow interior of drill guide 20. Once inserted into access portal/drill guide 20, drill 24 may be used to drill down into the joint to form a space for the placement of a graft/implant 26 within the joint, as shown in FIG. 10. In one embodiment, a graft tamp mallet may be inserted within the interior space of the drill guide 20 and used to tap on the implant 26 to fully secure it within the joint. Drill guide 20 may then be removed, and the implant 26 remains in place within the SI joint.

The inventive procedure described herein uses an elongated blunt-tipped pin 10 described herein that is accurately placed within the SI joint. In one embodiment, this can be accomplished with the use of contrast poured into its cannulated interior 12 of blunt-tipped pin 10 to assist the user in proper placement of blunt-tipped pin 20 within the joint. In another embodiment, medicine may also be poured into the hollow interior portion 12 of blunt-tipped pin 10 so that it can be delivered to the joint during the time blunt-tipped pin 10 probes for the optimal location or after blunt-tipped pin 10 has been placed in the proper location. With the use of various other instruments described herein such as dilator 18 and access portal/drill guide 20, an implant 26 may be inserted through the accurately-placed drill guide 20 to ensure proper placement of the implant into the joint.

Having described aspects of the present disclosure in detail, it will be apparent that modifications and variations are possible without departing from the scope of aspects of the present disclosure as defined in the appended claims. As various changes could be made in the above constructions, products, and methods without departing from the scope of aspects of the present disclosure, it is intended that all matter contained in the above description and shown in the accompanying drawings shall be interpreted as illustrative and not in a limiting sense.

The invention claimed is:

1. A joint stabilization method comprising:
   placing an elongated blunt-tipped pin within a joint of a human, the blunt-tipped pin including a cannulated interior;
   placing at least one of contrast and medicine within the cannulated interior of the elongated blunt-tipped pin;
   placing a dilator having a substantially hollow interior over the elongated blunt-tipped pin, while the elongated blunt-tipped pin remains inserted within the joint;
   placing a drill guide over the dilator and the elongated blunt-tipped pin, the drill guide having a substantially hollow interior section;

removing the dilator and the elongated blunt-tipped pin, leaving the drill guide;

drilling through the interior of the drill guide to provide a pathway for an implant; and placing the implant within the pathway, the implant to reside within the joint.

2. The method of claim 1, further comprising:

removably affixing one end of a connector to a proximal end of the elongated blunt-tipped pin;

fastening a liquid holding container to an opposite end of the connector; and releasing from the liquid holding container at least one of contrast and medicine through the connector and into the cannulated interior of the blunt-tipped pin.

3. The method of claim 1, wherein the joint into which the elongated blunt-tipped pin is placed is a sacroiliac (SI) joint.

4. The method of claim 1, wherein the elongated blunt-tipped pin is substantially non-bending.

5. The method of claim 1, further comprising utilizing a handle to hold, handle and/or manipulate the elongated blunt-tipped pin.

6. The method of claim 1, wherein placing of the dilator over the elongated blunt-tipped pin includes inserting the dilator into the joint to distract the joint.

7. The method of claim 1, wherein the dilator includes a window to allow a user to at least one of view the depth that the dilator has been inserted into the joint and ensure flush contact with the elongated blunt-tipped pin.

8. A system for stabilizing a human joint, the system comprising:

an elongated blunt-tipped pin configured to be inserted within a joint of a human, the blunt-tipped pin including a cannulated interior;

a dilator having a substantially hollow interior configured to be placed over the elongated blunt-tipped pin, while the elongated blunt-tipped pin remains inserted within the joint; and a drill guide having a substantially hollow interior configured to be placed over the dilator and the elongated blunt-tipped pin, the drill guide configured to receive at least a portion of a drill for providing a pathway for an implant.

9. The system of claim 8, wherein the cannulated interior of the elongated blunt-tipped pin is configured to receive at least one of contrast and medicine therein.

10. The system of claim 8, wherein the elongated blunt-tipped pin is substantially non-bending.

11. The system of claim 8, wherein the joint into which the elongated blunt-tipped pin is configured to be inserted is a sacroiliac (SI) joint.

12. The system of claim 8, further comprising a connector configured to be removably affixed at a first end to a proximal end of the elongated blunt-tipped pin and fastened at its second end to a liquid holding container containing at least one of contrast and medicine, which is released through the connector and into the cannulated interior of the blunt-tipped pin.

13. The system of claim 8, wherein placing of the dilator over the elongated blunt-tipped pin includes placing the dilator into the joint to distract the joint.

14. The system of claim 8, wherein the dilator includes a window to allow a user to at least one of view the depth that the dilator has been inserted into the joint and ensure flush contact with the elongated blunt-tipped pin.

* * * * *